United States Patent [19]

Squires

[11] 4,001,817
[45] Jan. 4, 1977

[54] ULTRASONIC RODENT CONTROL DEVICE AND METHOD

[75] Inventor: Robert L. Squires, Rantoul, Ill.

[73] Assignee: American Electronics Corporation, Champaign, Ill.

[22] Filed: Oct. 23, 1974

[21] Appl. No.: 517,172

[52] U.S. Cl. .......................... 340/384 E; 331/178
[51] Int. Cl.² ........................................ G08B 3/00
[58] Field of Search ............ 340/384 R, 384 E, 15; 331/4, 178, 64; 43/1

[56] References Cited
UNITED STATES PATENTS

| | | | |
|---|---|---|---|
| 3,305,824 | 2/1967 | Brooks et al. | 340/15 |
| 3,503,039 | 3/1970 | Aniskovicz | 340/15 |
| 3,516,054 | 6/1970 | Somer | 340/15 |
| 3,596,193 | 7/1971 | Dunwoodie | 331/178 X |
| 3,636,559 | 1/1972 | Grande et al. | 340/384 R |
| 3,838,418 | 9/1974 | Brown | 340/384 E |
| 3,872,472 | 3/1975 | Moschgat | 340/15 X |
| 3,873,960 | 3/1975 | Gateo | 340/384 R |

*Primary Examiner*—John W. Caldwell
*Assistant Examiner*—William M. Wannisky
*Attorney, Agent, or Firm*—Silverman & Cass, Ltd.

[57] ABSTRACT

A method and apparatus for controlling rodents is disclosed utilizing ultrasonic signals. The ultrasonic signals are of the square wave type. They are varied from approximately 28 to 20 KHz during the first time period of approximately 20 microseconds, then maintained at a frequency of approximately 20 KHz for a second time period of approximately 780 microseconds. The generated square wave signals are converted to sound waves by a transducer such as a speaker. The frequencies employed and the duration of these frequencies are selected to maximize the irritating effect upon the rodents.

18 Claims, 2 Drawing Figures

4,001,817

ULTRASONIC RODENT CONTROL DEVICE AND METHOD

BACKGROUND OF THE INVENTION

This invention relates to the control of pests, and more particularly, to an apparatus and method for controlling and eliminating rodents, particularly rats, from a prescribed area. The most pertinent prior art U.S. Pat. Nos. are: 3,636,559, 2,922,999.

It has long been known that rodents, and particularly rats, are adversely affected by high frequency sound waves which are generally beyond the audible frequency spectrum of human beings and domestic animals. In particular, rodents are adversely affected by sound waves extending from 18 KHz. It has also been found that sound waves generated from square wave signals are even more irritating to rodents. It should be understood that square wave signals are defined to include what may be more aptly described as rectangular shaped periodic signals, as well as square shaped periodic signals. Furthermore, it is extremely difficult to generate waves which have square corners so that waves which are substantially square should also be considered as falling within the definition of square wave signals.

It has been discovered that rats which were trained to easily traverse a maze became disoriented and could not traverse the maze when subjected to ultrasonic sound waves. This phenomina occurred at sound levels of 2 to 5 db. A decrease in the reproduction rate of rats continuously exposed to ultrasonic sound waves has also been noted. It has been theorized that the ultrasonic sound waves are in nearly the same frequency range as the communication sounds made by the rats so that the ultrasonic sound waves disrupt their communications. As communication between the rats plays an important role in their reproduction ritual, a disruption of communication due to the generated ultrasonic sound waves results in reduction in the reproduction rate.

An ultrasonic sound wave of any frequency within the range of 18 to 30 KHz, at a sufficient intensity or loudness, will be extremely irritating to a rodent, causing the rodent to do almost anything, including on occasion self-destruction, to escape the sound; however, if the rodent does not escape from the area in which the ultrasonic sound wave is present, and is not destroyed, it will develop a deafness immunity to the sound wave which is known as the "slotted hearing syndrome". The rodent will lose this deafness immunity if generation of the ultrasonic sound wave is discontinued for a period of time so that the rodent will have to redevelop the deafness immunity upon resumption of the generation of the ultrasonic sound wave. The rodent's deafness immunity is confined to the particular frequency of ultrasonic sound wave to which it is subjected so that a slight variation of the frequency being generated, after immunity has developed, will again irritate the rodent.

Several different devices have been manufactured for controlling rodents. Although the manufacturers of these devices may not have been aware of the deafness immunity characteristic of rodents, they were aware of the fact that the generation of ultrasonic sound waves which vary in frequency and duration was far more irritating to rodents than the generation of an ultrasonic sound wave frequency. Consequently, the devices previously manufactured generated ultrasonic sound waves which varied in a number of ways in order to irritate the rodents. Certain devices produced ultrasonic sound waves which continuously varied in frequency from 20 KHz to 30 KHz then back to 20 KHz. Others varied the frequency as noted and also varied the intensity or amplitude of the sound waves generated. Still other devices interrupted the cyclically varying ultrasonic sound wave frequencies at varying interruption rates. None of these devices, however, recognized and utilized the facts that (a) rodents are most irritated by some particular frequencies within the ultrasonic frequency range and (b) that the variation over the ultrasonic frequency range of the sound waves produced need be for only a relatively short period of time in order to prevent the rodent from developing a deafness immunity. The recognition and utilization of these characteristics comprise the heart of this invention. The implementation of these characteristics via the method and apparatus described in this application results in the generation of ultrasonic sound waves which are most irritating and devastating to rodents.

SUMMARY OF THE INVENTION

In practicing this invention a method and apparatus for repelling rodents are provided. The apparatus includes a control signal device which is operative to develop a variable control signal for a first predetermined time period and a fixed control signal for a second predetermined time period. The apparatus also includes a square wave generation device which generates ultrasonic square waves within a particular range of frequencies. The generation device is coupled to the control device and operative in response to the variable control signal to vary the square waves generated over a first frequency range during the first predetermined time period. The generator is operative in response to the fixed control signal from the control signal device to maintain a predetermined square wave frequency for the second predetermined time period. A transducer is coupled to the square wave generator and is operative in response to the square wave signals coupled thereto to generate sound waves having the same frequency as the frequency of the square wave signals.

The method of the invention comprises the control of rodents by subjecting them to the signals of the type described, irrespective of how generated.

DETAILED DESCRIPTION OF THE PREFERRED EMBODIMENT

Figure 1:
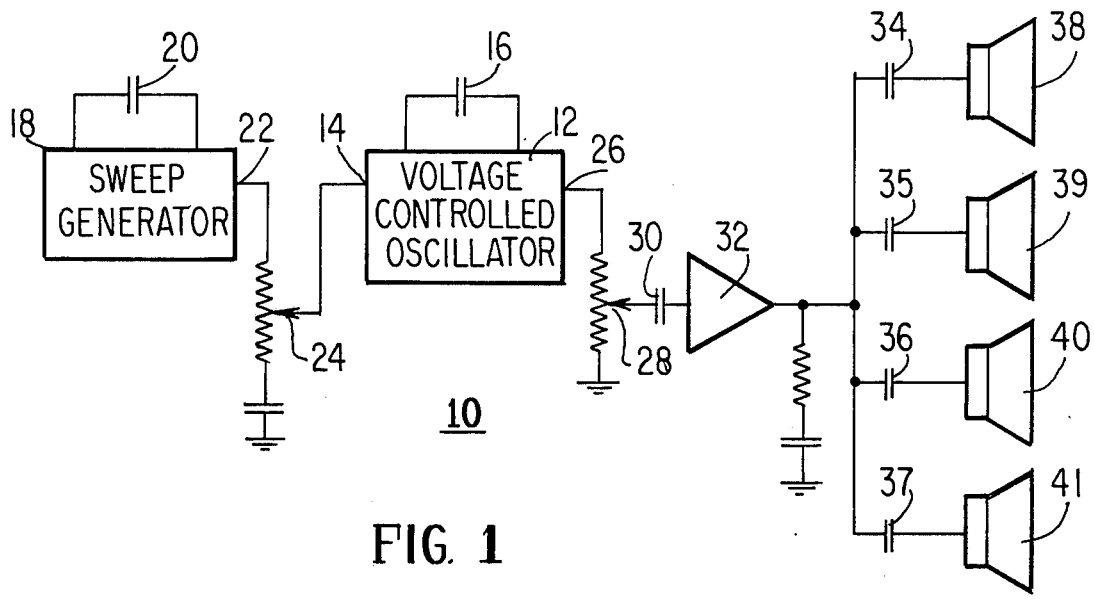
FIG. 1 is a partial schematic and partial block diagram of the apparatus of this invention.

Referring to FIG. 1, the signal generation apparatus of this invention is designated generally by the reference character 10. A voltage controlled oscillator 12 generates square wave signals. These square wave signals may be varied in frequency by a variation in amplitude of an applied control voltage at input 14. Capacitor 16 is the minimum frequency determining capacitor for voltage controlled oscillator 12. Capacitor 16 is selected such that with zero or a reference voltage applied at input 14, voltage controlled oscillator 12 will develop a square wave signal of approximately 18 to 22 KHz; and is preferably selected to be at a frequency in the range between 20 and 22 KHz, the frequency which has been found most irritating to rodents.

Figure 2:
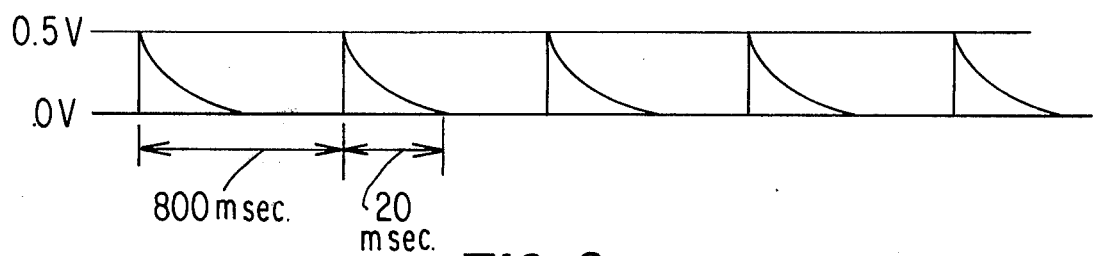
FIG. 2 is a graph showing the waveform at one point in the circuitry of FIG. 1.

A sweep generator 18 repetitively generates a varying amplitude voltage signal, which, in the preferred embodiment beings at approximately 0.5 volts and decreases to 0 voltage within approximately 20 milliseconds after initiation. This varying amplitude voltage is repeated at intervals of approximately 800 milliseconds as shown by the graph of FIG. 2. Capacitor 20, shown connected to sweep generator 18, is the timing capacitor for sweep generator 18 and its capacitance is selected to provide the 800 millisecond period between sweeps. The output of sweep generator 18 developed at 22 is coupled through potentiometer 24 to input 14 of voltage controlled oscillator 12.

Potentiometer 24 is adjusted to attenuate the maximum voltage coupled from output 22 of generator 18 to input 14 of voltage controlled oscillator 12. The maximum voltage coupled to input 14 will determine the maximum frequency developed by voltage controlled oscillator 12. In the preferred embodiment potentiometer 24 is adjusted such that voltage controlled oscillator 12 develops a maximum frequency of approximately 28 KHz.

The square wave signals developed by voltage controlled oscillator 12 are coupled from output terminal 26 through potentiometer 28 and DC blocking capacitor 30 to the input of amplifier 32. Potentiometer 28 provides an adjustable attenuation for the square wave signals coupled to amplifier 30 in order to provide a gain control for amplifier 30. In the preferred embodiment, potentiometer 28 is adjusted such that the signal coupled to amplifier 32 is approximately 0.7 volts. This will result in an output signal from amplifier 32 of approximately 20 volts rms. The amplified signals developed by amplifier 32 are coupled through matching and coupling capacitors 34 through 37 to transducers 38 through 41, respectively where the square wave signals are converted to sound waves. In the embodiment shown transducers 38 through 41 are speakers, for example, of the electrodynamic type. Each is capable of developing sound intensities in excess of 100 db in response to the 20 volt rms signal from amplifier 32. Applicant has found that rodents will be affected by sound waves of less than 5 db at a distance of 25 to 50 feet from a speaker. With four speakers each developing sound wave intensities of 103 db, a 10,000 square foot area can be covered, assuming there are a minimum number of barriers in that area. It should be understood, of course, that speakers of the electrostatic type could be utilized instead of the electrodynamic type, and that other types of transducers may also be utilized.

In operation, sweep generator 18 will develop a voltage at output 22 that sweeps from approximately 0.5 volts to 0 voltage in a first predetermined time period of approximately 20 milliseconds as shown by FIG. 2; then remains at 0 voltage for a second predetermined time period of approximately 780 milliseconds. At the end of the 780 millisecond period, the voltage at output 22 again increases to approximately 0.5 volts and the sweep begins so that the output of sweep generator 18 continuously alternates between varying over a first voltage range in a first predetermined time period of approximately 20 milliseconds, then maintaining a fixed voltage for a second predetermined time period of approximately 780 milliseconds.

The sweep voltage coupled from sweep generator 18 to voltage controlled oscillator 12 causes voltage controlled oscillator 12 to develop a square wave signal that varies from approximately 28 KHz to approximately 20 KHz in the approximately 20 millisecond period. The 0 volt signal developed by sweep generator 18 for the approximately 780 millisecond period following the approximately 20 millisecond sweep voltage will cause oscillator 12 to develop a square wave signal of approximately 20 KHz for that period. This technique of alternating between a square wave signal which varies from 28 KHz to 20 KHz in frequency for 20 milliseconds and a square wave signal of 20 KHz signal for 780 milliseconds will be cyclically repeated because of the cyclical repetition of the signals from sweep generator 18.

The square wave signals developed by oscillator 12 will be amplified by amplifier 32 and converted to ultrasonic sound waves by speakers 38 through 41 as previously noted, producing repetitive cycles of sound waves first varying from 28 KHz to 20 KHz for approximately 20 milliseconds then maintaining a constant frequency of approximately 20 milliseconds for approximately 780 milliseconds. The maintenance of a 20 KHz sound wave for approximately 780 milliseconds followed by a variation in frequency of the sound waves from 28 KHz to 20 KHz in a period of approximately 20 milliseconds, all at an intensity of approximately 100 db, maximizes the period during which the most irritating signal is transmitted to the rodent while also minimizing the period of varying ultrasonic sound wave frequency. This varying period is minimized but remains sufficient to prevent development of a deafness immunity to the sound waves.

It is to be understood that the method of maintaining one frequency for a first period of time then varying the frequency over a predetermined range in a second predetermined period of time as described above with regard to the specific apparatus is also contemplated as being within the scope of the invention. As can be seen, the apparatus described above for carrying out the method is only one of the many combinations which may be formed for carrying out this method and is exemplary of a more practical and simple version applicable to commercial apparatus. It would be relatively simple for persons skilled in the art to construct one of the combinations not specifically described so that such a construction should not be considered to depart from the scope of this application as defined in the appended claims.

What is desired to be claimed and secured by Letters Patent from the United States is:

1. A signal generation apparatus for use in repelling rodents comprising:
control signal means operative repetitively and alternatively to develop a particular continuously variable control signal for a first predetermined time period and a particular fixed control signal for a second predetermined time period;
square wave generation means for generating ultrasonic square wave signals within a particular range of frequencies, said generation means being coupled to said control signal means and operative in response to said continuously variable control signal to continuously vary said square wave frequency over a particular frequency range during said first predetermined time period and operative in response to said particular fixed control signal to maintain a predetermined square wave frequency for said second predetermined time period and, transducer means coupled to said square wave generation means for converting said square wave signals to sound waves.

2. The apparatus of claim 1 wherein said variable frequency range extends from approximately 28 KHz to 20 KHz.

3. The apparatus of claim 1 wherein said maintained predetermined frequency is approximately 20 KHz.

4. The apparatus of claim 1 wherein said first predetermined time period is approximately 20 microseconds and said second predetermined time period is approximately 780 microseconds.

5. The apparatus of claim 1 further including, amplifier means coupling said generation means to said transducer means for amplifying the electrical signal sufficiently to provide an ultrasonic sound level from said transducer means of approximately 100 db.

6. The apparatus of claim 1 wherein said control signal means is a sweep generator for generating a variable control signal that varies between a first and second amplitude during said first predetermined time period and a fixed amplitude control signal during said second predetermined time period.

7. The apparatus of claim 6 wherein said first and second predetermined time periods continuously alternate.

8. The apparatus of claim 6 wherein said first predetermined time period is approximately 20 microseconds and said second predetermined time period is approximately 780 microseconds.

9. The apparatus of claim 6 wherein said variable frequency range extends from approximately 28 KHz to 20 KHz and said maintained predetermined frequency is approximately 20 KHz.

10. A signal generation apparatus for use in repelling rodents comprising:
control signal means operative repetitively to develop a particular continuously variable control signal for a period of approximately 20 microseconds and a particular fixed control signal for a period of approximately 780 microseconds, said variable control signal and fixed control signal continuously alternating;
square wave generation means coupled to said control signal means and operative in response to said continuously variable control signal to generate square wave signals continuously varying in frequency from approximately 28 KHz to 20 KHz, said generation means being operative in response to said particular fixed control signal to generate square wave signals of approximately 20 KHz; and
transducer means coupled to said square wave generation means for converting said square wave signals to sound waves.

11. The apparatus of claim 10 wherein said control signal means is a sweep generator, said variable control signal varying between a first and second voltage amplitude during said first predetermined time period, said fixed control signal being a fixed voltage amplitude for said second predetermined time period.

12. The apparatus of claim 11 wherein said square wave generation means is a voltage controlled oscillator operative in response to said varying voltage amplitude to vary from approximately 28 KHz to 20 KHz and operative in response to said fixed voltage amplitude to generate square wave signals of approximately 20 KHz.

13. A method for repelling rodents comprising the steps of:
a. generating an ultrasonic square wave signal that varies over a frequency range in a first predetermined time period;
b. generating an ultrasonic square wave signal at a predetermined frequency for a second predetermined time period;
c. continuously alternately repeating steps (a) and (b) and;
d. converting said generated ultrasonic square wave signals to sound waves and subjecting the area from which the rodents are to be repelled to said sound waves.

14. The method of claim 13 wherein said first predetermined time period is approximately 20 microseconds and said second predetermined time period is approximately 780 microseconds.

15. The method of claim 13 wherein said variable frequency range extends from approximately 28 KHz to 20 KHz and said maintained predetermined square wave frequency is approximately 20 KHz.

16. A method for repelling rodents comprising the steps of repetitively and alternately,
generating a square wave sound signal which continuously varies in frequency from a first ultrasonic frequency to a second ultrasonic frequency in a first predetermined period,
maintaining said second ultrasonic frequency and said square wave sound developed thereby for a second predetermined period.

17. The method of claim 16 wherein said first ultrasonic frequency is approximately 28 KHz and said second ultrasonic frequency is approximately 20 KHz.

18. The method of claim 16 wherein said first predetermined period is approximately 20 microseconds and said second predetermined period is approximately 780 microseconds.

* * * * *